(12) United States Patent
Oishi

(10) Patent No.: US 10,843,486 B2
(45) Date of Patent: Nov. 24, 2020

(54) LABEL ISSUANCE DEVICE AND ANTENNA

(71) Applicant: TOSHIBA TEC KABUSHIKI KAISHA, Tokyo (JP)

(72) Inventor: Sadatoshi Oishi, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/257,819

(22) Filed: Jan. 25, 2019

(65) Prior Publication Data

US 2019/0240994 A1  Aug. 8, 2019

(30) Foreign Application Priority Data

Feb. 5, 2018 (JP) ................. 2018-018444

(51) Int. Cl.
*B41J 3/50* (2006.01)
*G06K 17/00* (2006.01)
*B41J 3/407* (2006.01)
*B65C 9/46* (2006.01)
*B65C 9/18* (2006.01)
*B65C 9/00* (2006.01)

(52) U.S. Cl.
CPC ............ *B41J 3/50* (2013.01); *B41J 3/4075* (2013.01); *B65C 9/1865* (2013.01); *B65C 9/46* (2013.01); *G06K 17/0025* (2013.01); *B65C 2009/0003* (2013.01)

(58) Field of Classification Search
None
See application file for complete search history.

(56) References Cited

U.S. PATENT DOCUMENTS

| | | | | |
|---|---|---|---|---|
| 7,327,265 | B2 * | 2/2008 | Tsujimura | G06K 7/10316 340/10.51 |
| 8,224,262 | B2 * | 7/2012 | Oishi | H04B 1/525 358/1.15 |
| 8,692,674 | B2 * | 4/2014 | Hioki | B32B 37/226 156/182 |
| 10,241,492 | B2 * | 3/2019 | Oishi | B65H 20/02 |
| 2010/0219253 | A1 * | 9/2010 | Katsumata | G06K 7/10316 235/492 |
| 2018/0341243 | A1 | 11/2018 | Oishi | |

FOREIGN PATENT DOCUMENTS

JP   2010-152465 A   7/2010

* cited by examiner

*Primary Examiner* — K. Wong
(74) *Attorney, Agent, or Firm* — Kim & Stewart LLP

(57) ABSTRACT

A label issuance device includes a roller configured to convey a label including an RFID tag along a conveyance path, an antenna board disposed under the conveyance path and having planar surfaces that are perpendicular to a conveyance direction of the label, the antenna board including a substrate, a transmission line formed inwardly of an upper edge of the substrate that faces the conveyed label, and a ground layer formed on each of the planar surfaces of the substrate, and a reader/writer connected to the antenna board to read out and write data from and onto the RFID tag of the conveyed label.

20 Claims, 7 Drawing Sheets

LABEL ISSUANCE DEVICE AND ANTENNA

CROSS-REFERENCE TO RELATED APPLICATIONS

This application is based upon and claims the benefit of priority from Japanese Patent Application No. 2018-018444, filed on Feb. 5, 2018, the entire contents of which are incorporated herein by reference.

FIELD

Embodiments described herein relate generally to a label issuance device and an antenna.

BACKGROUND

In the related art, a label issuance device for issuing a label including a radio frequency identification (RFID) tag is known. In the label issuance device, data-communication with the RFID tag is executed via an antenna so that a reader/writer reads out and writes data from and on the RFID tag.

DETAILED DESCRIPTION

One or more embodiments provide an antenna and a label issuance device including the antenna which can reduce a width of a label in a conveyance direction.

In general, according to one embodiment, a label issuance device includes a roller configured to convey a label including an RFID tag along a conveyance path, an antenna board disposed under the conveyance path and having planar surfaces that are perpendicular to a conveyance direction of the label, the antenna board including a substrate, a transmission line formed inwardly of an upper edge of the substrate that faces the conveyed label, and a ground layer formed on each of the planar surfaces of the substrate, and a reader/writer connected to the antenna board to read out and write data from and onto the RFID tag of the conveyed label.

First Embodiment

Hereinafter, a label issuance device 1 using an antenna according to a first embodiment will be described with reference to FIGS. 1 to 6.

Figure 1:
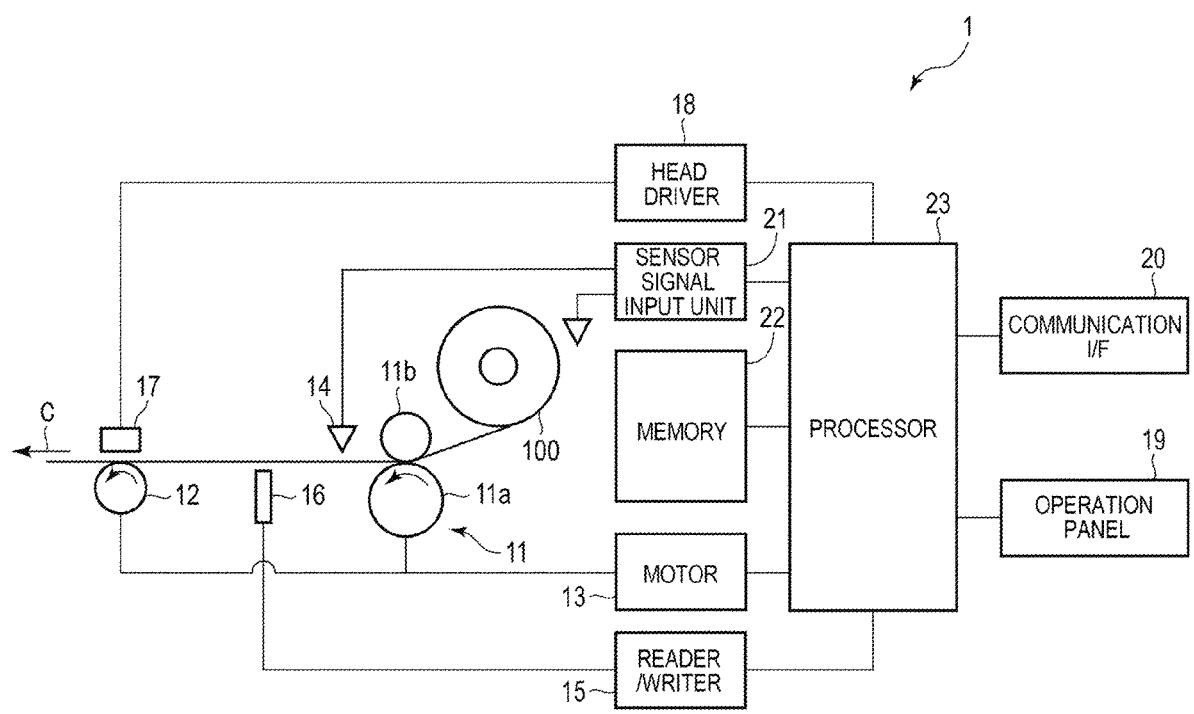
FIG. 1 shows a configuration of a label issuance device according to a first embodiment.

FIG. 1 shows a configuration of a label issuance device 1 according to a first embodiment. The label issuance device 1 is a device which conveys roll-shaped label paper 100, in which a plurality of labels 110 each including an RFID tag 111 as a wireless communication medium are arranged on belt-shaped backing paper 120, in a conveyance direction C, and writes data on the RFID tag 111 while printing on the label 110.

Label Paper 100

Figure 5:
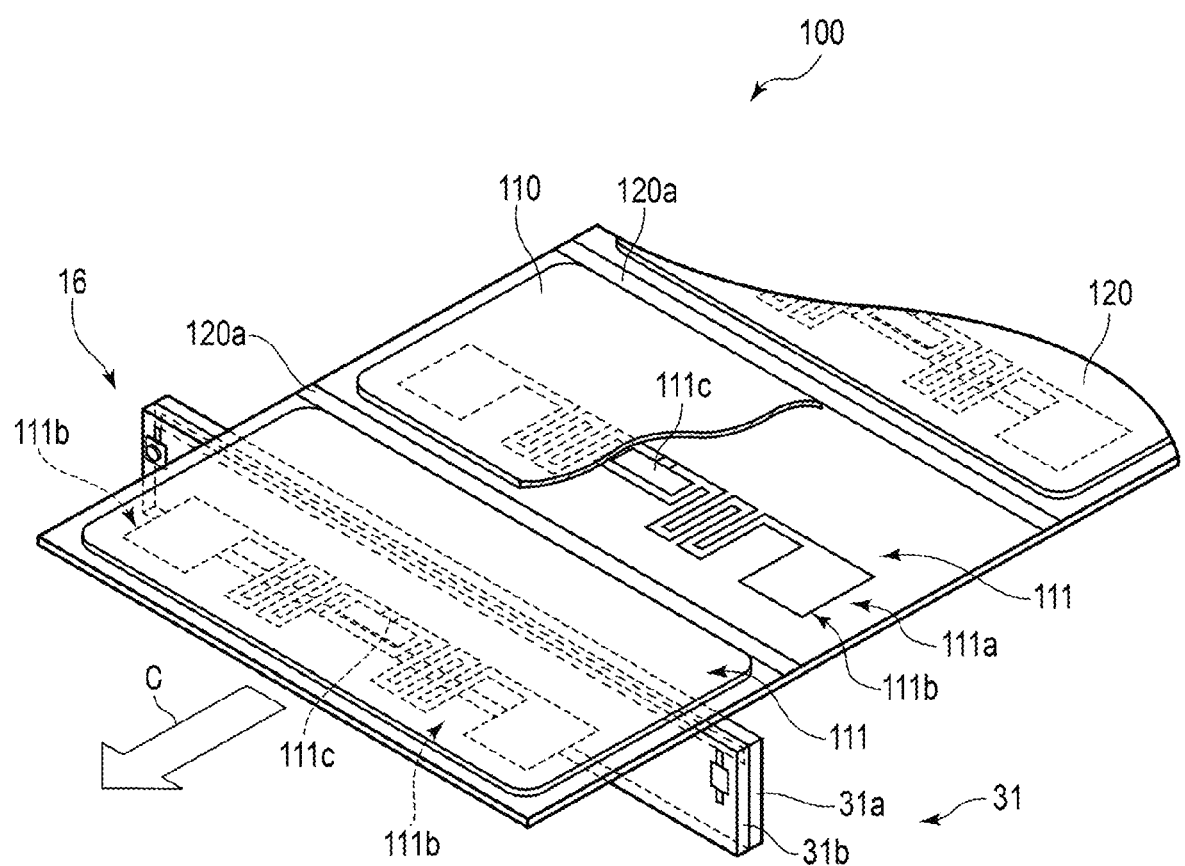
FIG. 5 shows configurations of the antenna and an RFID tag.
Figure 6:
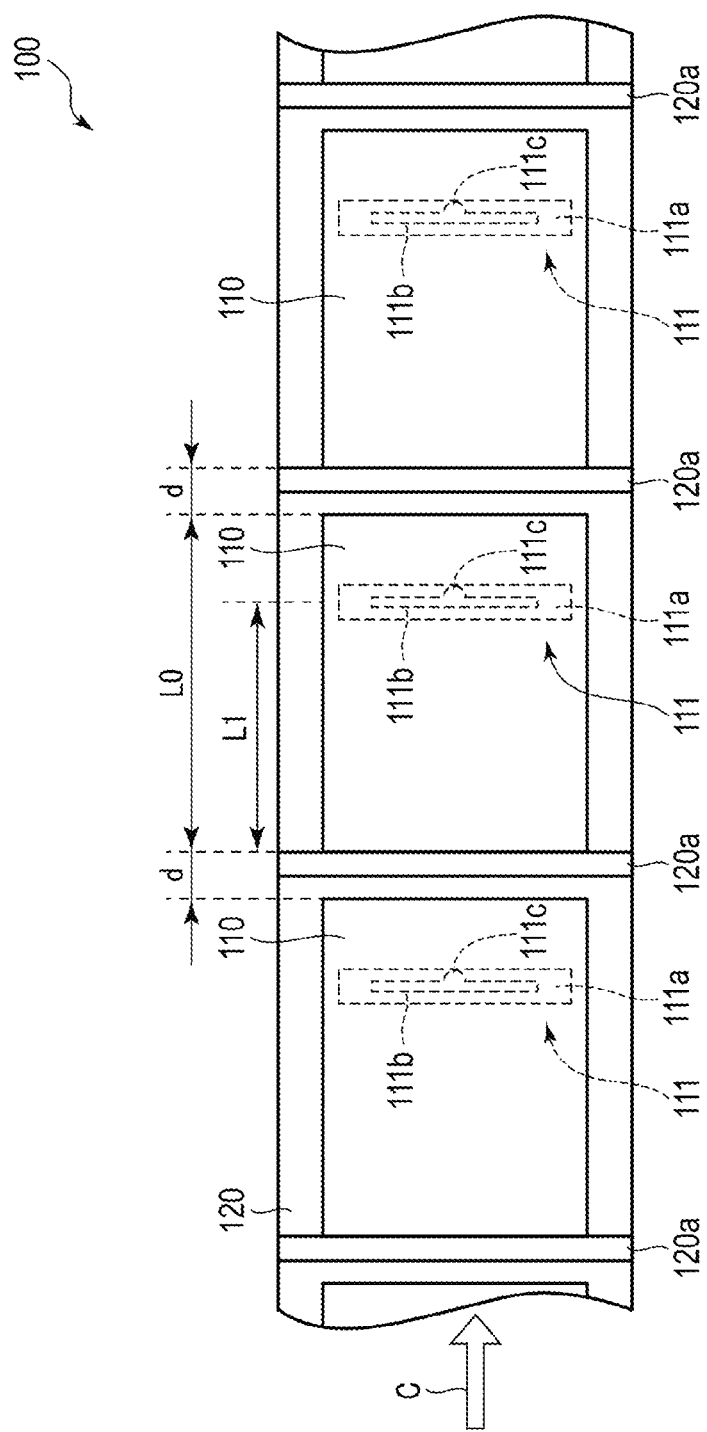
FIG. 6 is a plan view of label paper used in the label issuance device.

First, the label paper 100 will be described. As illustrated in FIGS. 5 and 6, the label paper 100 includes the label 110 including the RFID tag 111, and the backing paper 120, on which the plurality of labels 110 are provided, and is formed in the roll shape as the backing paper 120 is wound.

The plurality of labels 110 are attached to the backing paper 120 at regular intervals in a longitudinal direction of the backing paper 120. The RFID tag 111 is provided on an end of the downstream side of the label 110 in the conveyance direction C. The RFID tag 111 is provided on a surface of the label 110 facing the backing paper 120, that is, an adhesive surface of the label 110 to adhere to the backing paper 120. The RFID tag 111 is formed by, for example, arranging, on an inlay 111a, a tag antenna 111b including a matching circuit (loop portion) and an IC chip 111c. The RFID tag 111 is a passive tag without a battery.

An attachment position of the RFID tag 111 to the label 110 is appropriately set depending on a type of the label paper 100. For example, in an example illustrated in FIG. 6, the RFID tag 111 is disposed in the label paper 100 within a range of a distance L1 from a leading end of the label 110 in the conveyance direction C, namely, from an end at the secondary side of the conveyance direction C, which is shorter than a whole length L0 of the label 110 in the same direction as the conveyance direction (L1<L0). In addition, the RFID tag 111 is arranged on the label 110, such that a longitudinal direction of the tag antenna 111b of the RFID tag 111 is perpendicular to the conveyance direction C.

An interval between the RFID tags 111 and 111 attached to the two adjacent labels 110 and 110, respectively, corresponds to a sum of the whole length L0 of the label 110 and a distance d between the adjacent labels 110 and 110, and the RFID tags 111 are arranged on the backing paper 120 at regular intervals.

For example, the backing paper 120 includes a mark 120a, which is provided over a width direction perpendicular to the longitudinal direction of the backing paper 120 at a position adjacent to the label 110 provided in the longitudinal direction. For example, a length of the mark 120a in the conveyance direction C is set to be shorter than the distance d between the labels 110 and 110.

Label Issuance Device 1

Hereinafter, the label issuance device 1 of the present embodiment will be described. As illustrated in FIG. 1, the label issuance device 1 includes a conveyance roller 11, a platen roller 12, a motor 13, a mark sensor 14, a reader/writer 15, an antenna or an antenna board 16, a printing head 17, a head driver 18, an operation panel 19, a communication interface (hereinafter, referred to as an I/F) 20, a sensor signal input unit 21, a memory 22, and a processor 23.

The label issuance device 1 conveys the roll-shaped label paper 100 on a conveyance path extending in one direction along the conveyance direction C by the conveyance roller 11 and the platen roller 12.

For example, the conveyance roller 11 conveys the label paper 100 along the conveyance path in the conveyance direction C by a pair of rollers 11a, 11b.

The platen roller 12 is provided to face the printing head 17. The platen roller 12 conveys the label paper 100 along the conveyance path in the conveyance direction C by being rotated. The platen roller 12 is disposed at the downstream side of the conveyance roller 11 and the mark sensor 14 on the conveyance path.

The motor 13 is functionally connected with the conveyance roller 11 and the platen roller 12. The motor 13 rotates the conveyance roller 11 and the platen roller 12. Specifically, the motor 13 conveys the label paper 100 in the conveyance direction C by rotating one roller 11a of the conveyance roller 11 and the platen roller 12 in a direction indicated by the arrow in FIG. 1.

The mark sensor 14 is provided to face the conveyance path. The mark sensor 14 is disposed at the downstream side of the conveyance roller 11 in the conveyance direction C. For example, the mark sensor 14 optically detects the mark 120a of the backing paper 120. The mark sensor 14 scans a surface of the backing paper 120, conveyed in the conveyance direction C, along the conveyance direction C. The mark sensor 14 outputs an ON signal to the processor 23 if an edge of the mark 120a at the downstream side in the conveyance direction C is detected, and outputs an OFF signal to the processor 23 if an edge of the mark 120a at the upstream side in the conveyance direction C is detected.

The reader/writer 15 is electrically connected with the antenna 16. The reader/writer 15 emits a non-modulated wave from the antenna 16 and amplitude-modulates a carrier in order to wirelessly communicate data with the RFID tag 111. The reader/writer 15 supplies power to the RFID tag 111 by emitting the non-modulated wave from the antenna 16 as described above, and amplitude-modulates the emitted carrier. Accordingly, the reader/writer 15 reads out data from the RFID tag 111 or writes data on the RFID tag 111 by receiving, via the antenna 16, a response wave returning from the RFID tag 111 by demodulating data at the RFID tag 111 and changing a load of the antenna 16.

Specifically, reading-out and writing on the RFID tag 111 by the reader/writer 15 starts as the reader/writer 15 emits the non-modulated wave from the antenna 16 to wirelessly communicate with the RFID tag 111, and the RFID tag 111 receives the non-modulated wave. Subsequently, if the reader/writer 15 amplitude-modulates the carrier emitting from the antenna 16 based on a signal encoded from communication data, the RFID tag 111 demodulates the amplitude-modulated communication data, and returns the response wave by changing the load of the antenna. The reader/writer 15 obtains the data of the RFID tag 111 by receiving the response wave via the antenna 16. The same operation is applied when data is written on the RFID tag 111 by the reader/writer 15.

Figure 2:
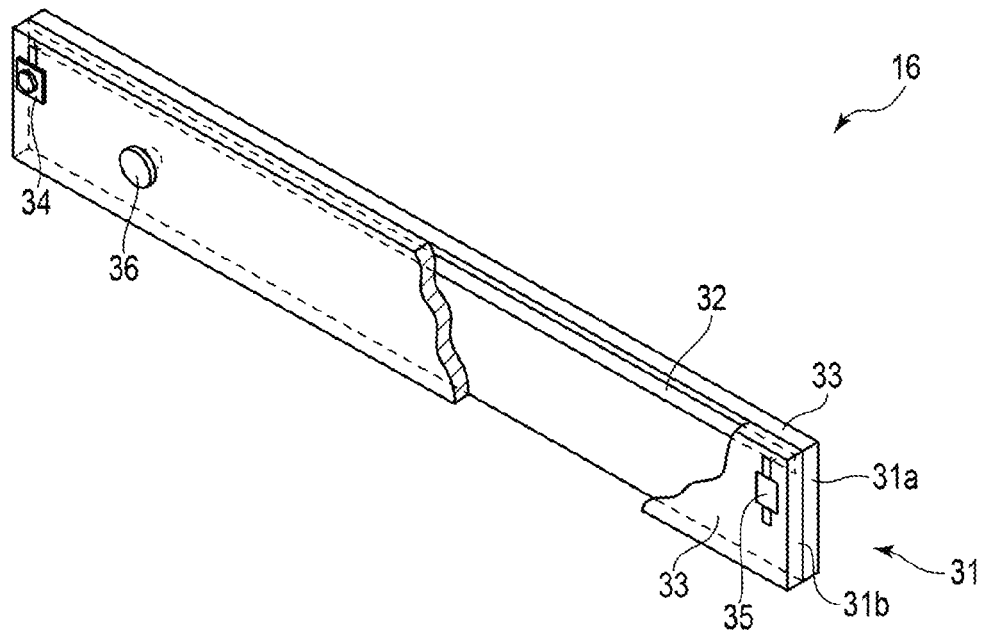
FIG. 2 is a perspective view of an antenna.

FIG. 2 is a perspective view of an antenna. The antenna is formed of a dielectric, and includes a substrate 31 having a plate shape which is long in one direction, a transmission line 32 provided on one end of the substrate 31 in a lateral direction, ground layers 33 provided on both main surfaces of the substrate 31, a coaxial connector 34 connected to one end of the transmission line 32, and a terminal resistor 35 connected to the other end of the transmission line 32.

In the antenna 16, the ground layers 33 are provided on both main surfaces of the substrate 31 and the transmission line 32 is provided on one end of the lateral direction, such that one end of the substrate 31 in the lateral direction is opened.

The antenna 16 is provided at the upstream side of the platen roller 12 and the printing head 17 in the conveyance direction C, and also, at the downstream side of the conveyance roller 11 and the mark sensor 14. The antenna 16 is arranged such that one end of the substrate 31 in the lateral direction, on which the transmission line 32 is provided, faces the conveyance direction C.

In a specific example, the antenna 16 is arranged in such a position that the main surfaces of the substrate 31 have an angle ranging from 60° to 120° with respect to the conveyance direction C, and more preferably, is arranged in such a position that the main surface of the substrate 31 have an angle of 90° with respect to the conveyance direction C, and the conveyance direction C and the substrate 31 are perpendicular to each other.

Figure 3:
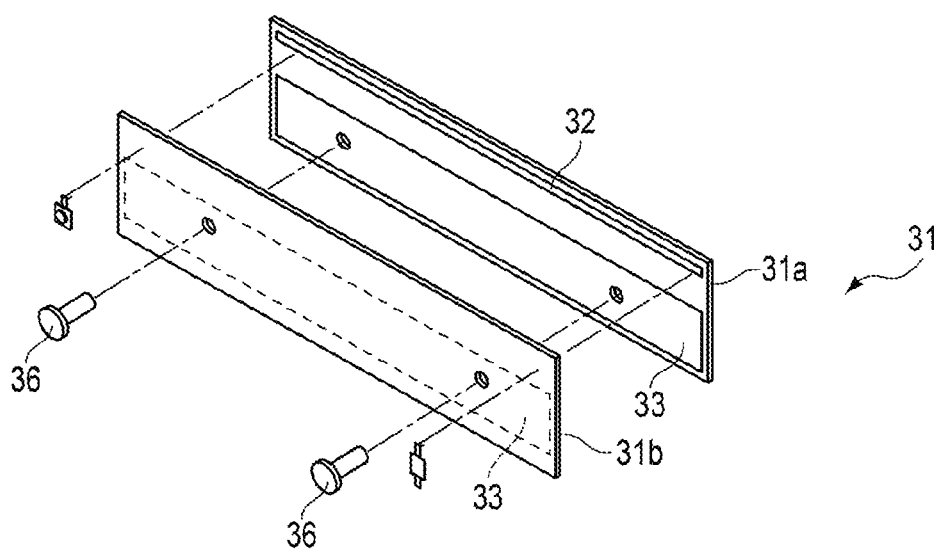
FIG. 3 is an exploded perspective view of the antenna.

As shown in FIG. 5, the substrate 31 is formed to have the same width or a slightly larger width as or than a width of the label 110 in the direction perpendicular to the conveyance direction C. The substrate 31 includes a first substrate 31a of a plate shape which is formed of a dielectric and is long in one direction, and a second substrate 31b which is formed of a dielectric and is formed in the same shape as the first substrate 31a. The substrate 31 is formed by integrally assembling the first substrate 31a and the second substrate 31b with their respective main surfaces facing each other. For example, the first substrate 31a and the second substrate 31b of the substrate 31 are positioned with their respective main surfaces facing each other, and are integrally fixed to each other by a bolt 36, as shown in FIG. 3.

The transmission line 32 forms a strip line. The transmission line 32 is provided in the substrate 31 at one end of the substrate 31 in the lateral direction. Specifically, for example, the transmission line 32 is provided on the main surface of the first substrate 31a facing the second substrate 31b, and also, on one end of the first substrate 31a in the lateral direction. The transmission line 32 is formed of printed wiring. For example, the transmission line 32 is linearly formed across from one end of the substrate 31 in the longitudinal direction to the other end.

For example, if the dielectric constant of the first substrate 31a and the second substrate 31b is 4.6, and thickness of each substrate is set to 1.6 mm, a width of the transmission line 32 perpendicular to the longitudinal direction is set to about 1.4 mm, and accordingly, an impedance is 50Ω.

The ground layers 33 are provided on both main surfaces of the substrate 31, and the ground layers 33 provided on both main surfaces of the substrate 31 electrically connect to each other.

Figure 4:
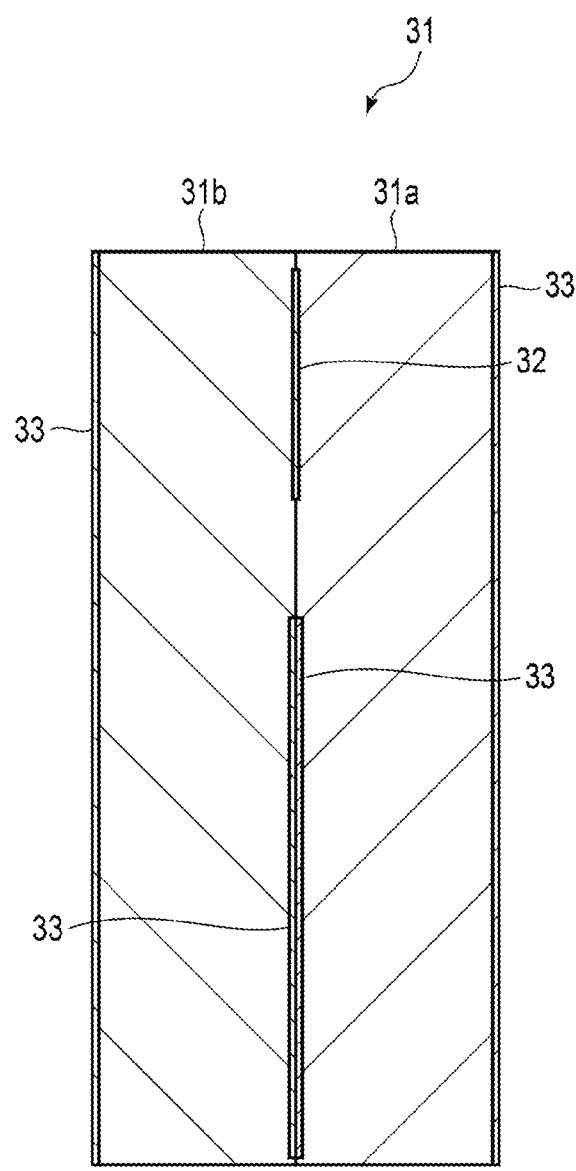
FIG. 4 is a cross-sectional view of the antenna.

For example, if the substrate 31 is formed by assembling the first substrate 31a and the second substrate 31b, the ground layer 33 is provided on the whole surface of one main surface of each of the first substrate 31a and the second substrate 31b. In addition, as shown in FIGS. 3 and 4, the ground layer 33 is provided on the other main surface of each of the first substrate 31a and the second substrate 31b facing each other, to avoid the transmission line 32, and specifically, is provided on the other end of each of the substrates 31a, 31b in the lateral direction. The ground layers 33 provided on the main surfaces of the first substrate 31a and the second substrate 31b electrically connect to each other by a through hole or the bolt 36 provided on the first substrate 31a and the second substrate 31b.

The coaxial connector 34 shown in FIG. 2 is connected to the reader/writer 15. The terminal resistor 35 has a resistance value set to 50Ω, for example.

The printing head 17 is disposed to face the platen roller 12 with the conveyance direction C therebetween. The printing head 17 is connected to the head driver 18. The printing head 17 prints on a printing surface of the conveyed label 110, that is, a surface opposite the surface on which the RFID tag 111 is provided.

The head driver 18 drives the printing head 17. The operational panel 19 is configured to receive input a command of a user. The communication I/F 20 has an interface function of connecting to another device which transmits, to the label issuance device 1, data to be written on the RFID tag 111 or data to be printed on the label 110.

The sensor signal input unit 21 inputs signals from various sensors including the mark sensor 14. Herein, the various sensors include an opening and closing sensor for detecting opening and closing of a member which opens and closes the label issuance device 1 to replace the label paper 100, for example, a cover, a door, a lid, or the like. For example, the opening and closing sensor is an optical sensor which optically detects closing or opening of the member. Alternatively, the opening and closing sensor may be a mechanical sensor which mechanically detects the closing or opening of the member. That is, the opening and closing sensor includes a detecting means for detecting the opening and closing of a member which is opened and closed to replace the conveyed RFID tag 111.

The memory 22 stores a program, and the like necessary for controlling the label issuance device 1. The processor is, for example, a central processing unit (CPU). The processor 23 is electrically connected to the motor 13, the reader/writer 15, the head driver 18, the operation panel 19, the communication I/F 20, the sensor signal input unit 21, and the memory 22. The processor 23 performs the function of the label issuance device 1 by controlling the respective elements according to a signal inputted from the sensor signal input unit 21 and the program, and the like stored in the memory 22. For example, the processor 23 controls reading-out and writing on the RFID tag 111 by controlling the reader/writer 15.

Hereinafter, a manufacturing method of the antenna 16 described above will be described. First, the ground layer 33 is provided on the whole surface of one main surface of the first substrate 31a. The transmission line 32 is provided on one end of the other main surface of the first substrate 31a in the lateral direction, and the ground layer 33 is provided on the other end of the other main surface of the first substrate 31a in the lateral direction, and is spaced from the transmission line 32 on a region of the other main surface except for the transmission line 32.

The ground layer 33 is provided on the whole surface of one main surface of the second substrate 31b, and the ground layer 33 is provided on a region of the other main surface of the second substrate 31b that faces the ground layer 33 provided on the other main surface of the first substrate 31a.

Subsequently, the coaxial connector 34 connected to one end of the transmission line 32 provided on the first substrate 31a is provided on one of the first substrate 31a and the second substrate 31b, and also, the terminal resistor 35 connected to the other end of the transmission line 32 is provided on the other one of the first substrate 31a and the second substrate 31b.

Subsequently, the first substrate 31a and the second substrate 31b are assembled with each other, such that their respective other main surfaces come into contact with each other, and the ground layers 33 provided on the other main surfaces come into contact with each other, and the first substrate 31a and the second substrate 31b are fixed to each other by the bolt 36. Accordingly, the antenna 16 is manufactured.

According to the label issuance device 1 configured as described above, the portion of the antenna 16 opened to communicate with the RFID tag 111 is one end of the substrate 31 of the plate shape in the shorter side. To this end, the antenna 16 can be made light and can be miniaturized. In addition, a width dimension of the antenna 16 in the conveyance direction of the label 110 corresponds to thickness of the antenna 16, and, since the thickness of the antenna 16 can be made thin, a space necessary for arranging the antenna 16 in the conveyance direction C can be reduced. Accordingly, the antenna 16 can be disposed in the proximity of the platen roller 12 and the printing head 17, and as a result, the shape of the label issuance device 1 in the conveyance direction can be made small.

In addition, the antenna 16 may have a simple configuration, and can be manufactured in a simple configuration by integrally assembling the first substrate 31a on which the transmission line 32 and the ground layer 33 are provided, and the second substrate 31b on which the ground layer 33 is provided.

According to the antenna 16 and the label issuance device according to the present embodiment described above, the width of the label 110 in the conveyance direction can be made small.

Second Embodiment

Figure 7:
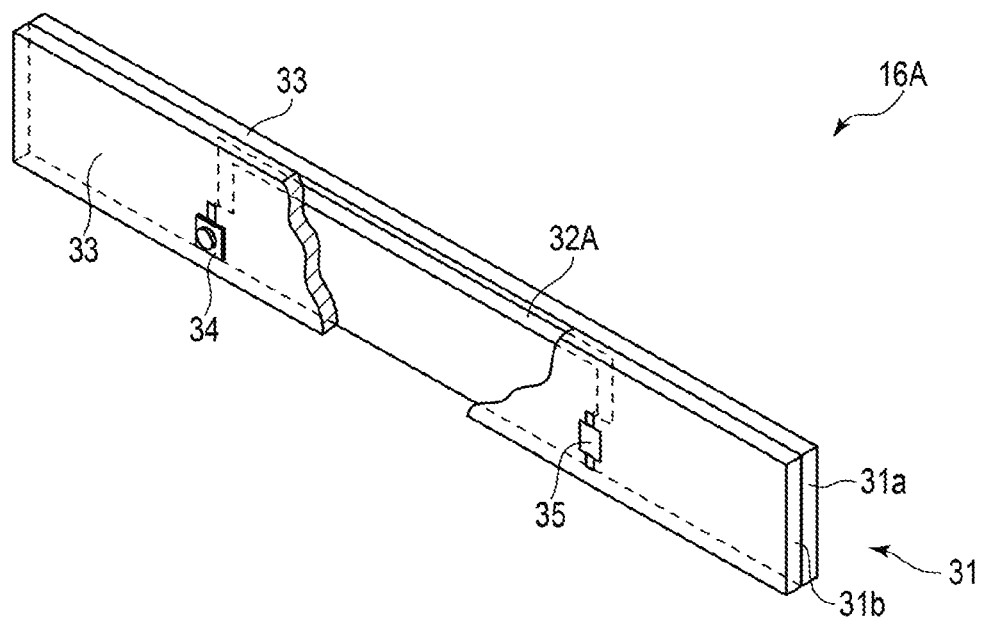
FIG. 7 is a perspective view of an antenna of a second embodiment.

Hereinafter, an antenna 16A used in the label issuance device 1 according to the second embodiment will be described with reference to FIG. 7. The same reference numerals are used for the same elements as those of the antenna 16 of the first embodiment described above, from among the elements of the antenna 16A of the second embodiment, and a detailed description thereof is omitted.

The antenna 16A is used in the label issuance device 1. As illustrated in FIG. 7, the antenna 16A includes a substrate 31, a transmission line 32A provided on one end of the substrate 31 in the lateral direction, a ground layer 33, a coaxial connector 34 connected to one end of the transmission line 32A, and a terminal resistor 35 connected to the other end of the transmission line 32A. That is, the antenna 16A differs from the antenna 16 of the first embodiment in the configuration of the transmission line 32A.

The transmission line 32A forms a strip line. The transmission line 32A is provided in the substrate 31 at one end of the substrate 31 in the lateral direction. Specifically, for example, the transmission line 32A is provided on the main surface of the first substrate 31a facing the second substrate 31b, and also, on one end of the first substrate 31a in the lateral direction. The transmission line 32A is formed of printed wiring. In addition, for example, the transmission line 32A is arranged at the center of the substrate 31 in the longitudinal direction, and is linearly formed. A length of the transmission line 32A is, for example, a half of the length of the substrate 31 in the longitudinal direction.

According to the antenna 16A configured as described above, the same effect as that of the above-described antenna 16 can be obtained, and the width of the label 110 in the conveyance direction can be made small.

Third Embodiment

Figure 8:
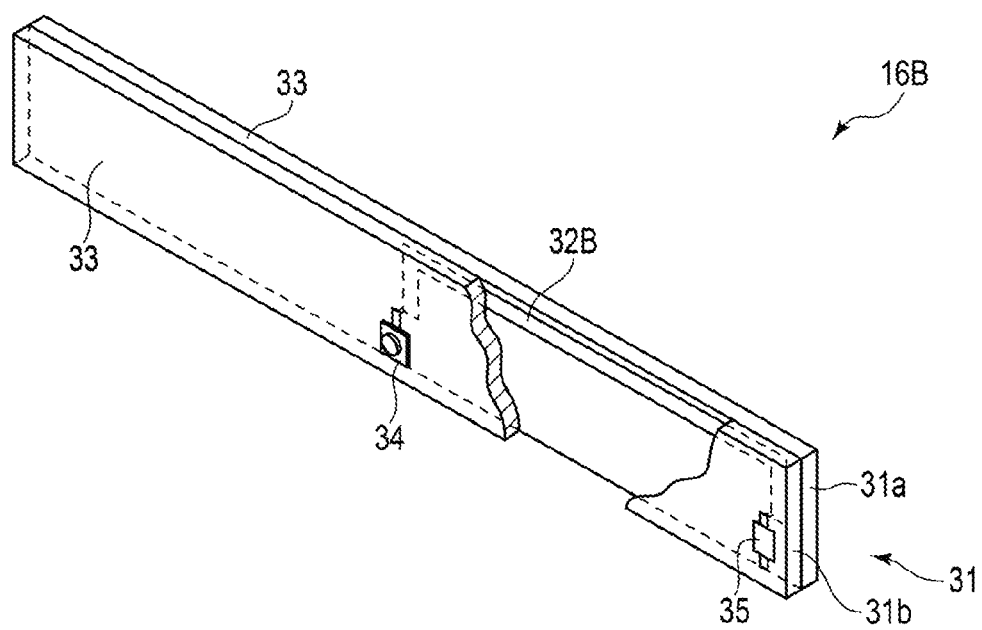
FIG. 8 is a perspective view of an antenna of a third embodiment.

Hereinafter, an antenna 16B used in the label issuance device 1 according to the third embodiment will be described with reference to FIG. 8. The same reference numerals are used for the same elements as those of the antenna 16 of the first embodiment and the antenna 16A of the second embodiment described above, from among the elements of the antenna 16B of the third embodiment, and a detailed description thereof is omitted.

The antenna 16B is used in the label issuance device 1. As illustrated in FIG. 8, the antenna 16B includes a substrate 31, a transmission line 32B provided on one end of the substrate 31 in the lateral direction, a ground layer 33, a coaxial connector 34 connected to one end of the transmission line 32B, and a terminal resistor 35 connected to the other end of the transmission line 32B. That is, the antenna 16B differs from the antenna 16 of the first embodiment and the antenna 16A of the second embodiment in the configuration of the transmission line 32B.

The transmission line 32B forms a strip line. The transmission line 32B is provided in the substrate 31 at one end of the substrate 31 in the lateral direction. Specifically, for example, the transmission line 32B is provided on the main surface of the first substrate 31a facing the second substrate 31b, and also, on one end of the first substrate 31a in the lateral direction. The transmission line 32B is formed of printed wiring. In addition, for example, the transmission line 32B is arranged on one side of the substrate 31 in the longitudinal direction, and is linearly formed. A length of the transmission line 32B is, for example, a half of the length of the substrate 31 in the longitudinal direction.

According to the antenna 16B configured as described above, the same effect as that of the above-described antenna 16, 16A can be obtained, and the width of the label 110 in the conveyance direction can be made small.

Fourth Embodiment

Hereinafter, an antenna 16C used in the label issuance device 1 according to the fourth embodiment will be described with reference to FIG. 9. The same reference numerals are used for the same elements as those of the antenna 16 of the first embodiment described above, from among the elements of the antenna 16C of the fourth embodiment, and a detailed description thereof is omitted.

The antenna 16C is used in the label issuance device 1. As illustrated in FIG. 9, the antenna 16C includes a substrate 31, a transmission line 32C provided on one end of the substrate 31 in the lateral direction, a ground layer 33, a coaxial connector 34 connected to one end of the transmission line 32C, and a terminal resistor 35 connected to the other end of the transmission line 32C. That is, the antenna 16C differs from the antenna 16 of the first embodiment in the configuration of the transmission line 32C.

The transmission line 32C forms a strip line. The transmission line 32C is provided in the substrate 31 at one end of the substrate 31 in the lateral direction. Specifically, for example, the transmission line 32C is provided on the main surface of the first substrate 31a facing the second substrate 31b, and also, on one end of the first substrate 31a in the lateral direction. The transmission line 32C is formed of printed wiring.

The transmission line 32C is provided across the substrate 31 from one end of the substrate 31 in the longitudinal direction to the other end, and is formed to be offset from one end of the substrate 31 in the lateral direction, in a direction from one end of the substrate 31 in the lateral direction toward the other end, at the center of the substrate 31 in the longitudinal direction, in other words, on a position facing the matching circuit of the tag antenna 111b of the RFID tag 111 conveyed in the conveyance direction C. Here, a length L of the transmission line 32C being offset in the longitudinal direction of the substrate 31 is set to, for example, about λ/16 if a wavelength is set to λ.

Figure 9:
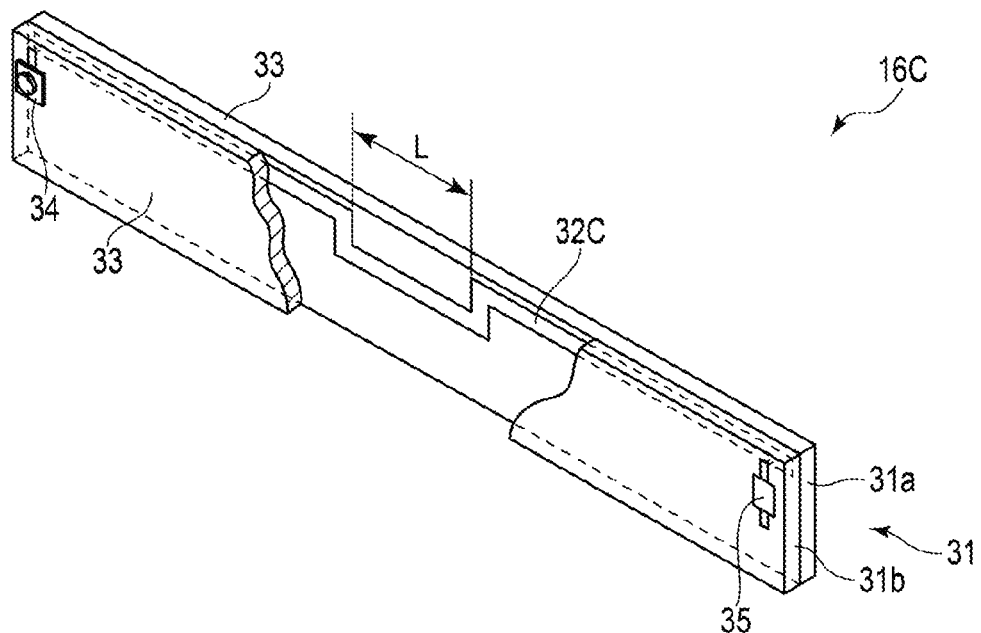
FIG. 9 is a perspective view of an antenna of a fourth embodiment.

For example, as illustrated in FIG. 9, the transmission line 32C bends from one end of the substrate 31 in the lateral direction toward the other end in a perpendicular direction at the center of the substrate 31, and further, bends in a perpendicular direction along the longitudinal direction of the substrate 31.

According to the antenna 16C configured as described above, the same effect as that of the above-described antenna 16 can be achieved, and the width of the label 110 in the conveyance direction can be made small. In addition, the antenna 16C can loosely couple the RFID tag 111 and the transmission line 32C by making the transmission line 32C offset from the RFID tag 111 conveyed in the conveyance direction C. Therefore, a communication defect caused by securely coupling the RFID tag 111 and the transmission line 32C can be reduced.

Fifth Embodiment

Hereinafter, an antenna 16D used in the label issuance device 1 according to the fifth embodiment will be described with reference to FIG. 10. The same reference numerals are used for the same elements as those of the antenna 16 of the first embodiment and the antenna 16C of the fourth embodiment described above, from among the elements of the antenna 16D of the fifth embodiment, and a detailed description thereof is omitted.

The antenna 16D is used in the label issuance device 1. As illustrated in FIG. 10, the antenna 16D includes a substrate 31, a transmission line 32D provided on one end of the substrate 31 in the lateral direction, a ground layer 33, a coaxial connector 34 connected to one end of the transmission line 32D, and a terminal resistor 35 connected to the other end of the transmission line 32D. That is, the antenna 16D differs from the antenna 16 of the first embodiment in the configuration of the transmission line 32D.

The transmission line 32D forms a strip line. The transmission line 32D is provided in the substrate 31 at one end of the substrate 31 in the lateral direction. Specifically, for example, the transmission line 32D is provided on the main surface of the first substrate 31a facing the second substrate 31b, and also, on one end of the first substrate 31a in the lateral direction. The transmission line 32D is formed of printed wiring. For example, the transmission line 32D is provided across the substrate 31 from one end of the substrate in the longitudinal direction to the other end. The transmission line 32D is formed to be offset from one end of the substrate 31 in the lateral direction toward the other end, at the center of the substrate 31 in the longitudinal direction, in other words, on a position facing the matching circuit of the tag antenna 111b of the RFID tag 111 conveyed along the conveyance path.

Figure 10:
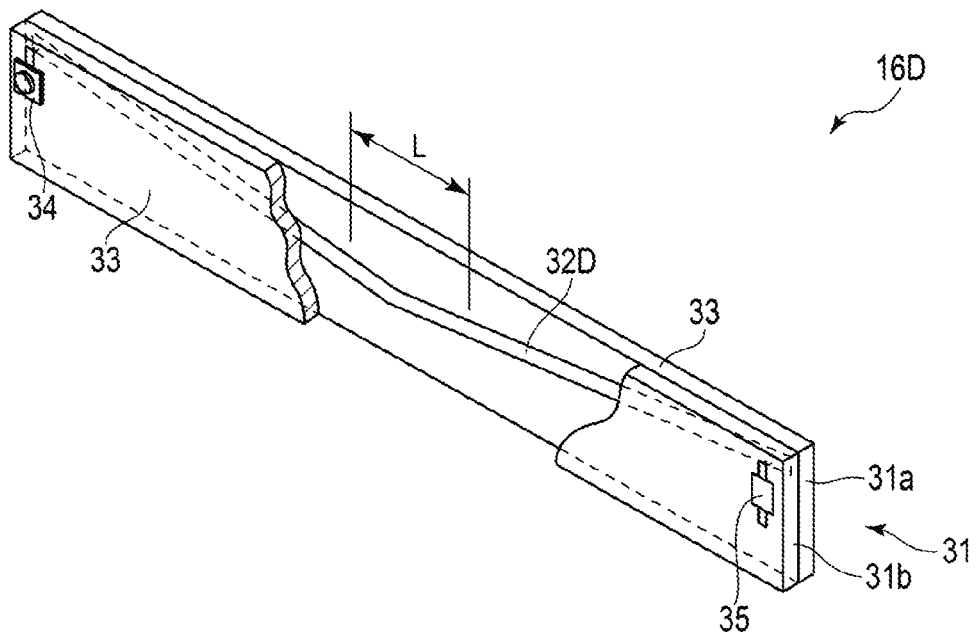
FIG. 10 is a perspective view of an antenna of a fifth embodiment.

For example, as illustrated in FIG. 10, the transmission line 32D extends from both ends of the substrate 31 in the longitudinal direction toward the center of the substrate 31 in the longitudinal direction, while sloping with respect to the longitudinal direction of the substrate 31, such that the transmission line 32D is offset most at the center of the substrate 31 in the longitudinal direction, from the conveyance path, that is, one end of the substrate 31 in the lateral direction.

Here, a length L of the transmission line 32D being offset in the longitudinal direction of the substrate 31 is set to, for example, about λ/16 if a wavelength is set to λ.

According to the antenna 16D configured as described above, the same effect as that of the above-described antennas 16 and 16C can be achieved, and the width of the label 110 in the conveyance direction can be made small, and also, a communication defect caused by securely coupling the RFID tag 111 and the transmission line 32D can be reduced.

The invention is not limited to the above-described embodiments, and in the implementation stage, the constituent elements can be modified and specified without departing from the gist thereof.

For example, in the above-described example, the antenna 16 includes the substrate 31 provided with the transmission line 32 and the ground layer 33 by assembling the first substrate 31a and the second substrate 31b by the bolt 36, but this should not be considered as limiting. For example, the antenna 16 may use a multi-layer printed wiring substrate. In this case, the antenna 16 may use a three-layer substrate, or may have a configuration in which a four-layer substrate is used, a transmission line is disposed on the second layer, and no wiring is disposed on the third layer, as the number of layers of a normal multi-layer printed wiring substrate.

If the first substrate 31a and the second substrate 31b can be integrally assembled with each other, the first substrate 31a and the second substrate 31b may be fixed to each other by an adhesive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A label issuance device comprising:
a roller configured to convey a label including an RFID tag along a conveyance path;
an antenna board disposed under the conveyance path and having a substrate that includes opposite planar surfaces that are perpendicular to a surface of the conveyed label, wherein a ground layer is formed on each of the opposite planar surfaces, and a transmission line is formed at an upper edge of the substrate that faces the conveyed label; and
a reader/writer connected to the antenna board to read out and write data from and onto the RFID tag of the conveyed label.

2. The device according to claim 1, wherein
the substrate includes first and second substrates, and
the transmission line is formed on one planar surface of the first substrate.

3. The device according to claim 2, wherein
the ground layer is formed on the other planar surface of the first substrate and on one planar surface of the second substrate that does not face the one planar surface of the first substrate.

4. The device according to claim 3, wherein
another ground layer is formed on the one planar surface of the first substrate and on the other planar surface of the second substrate.

5. The device according to claim 2, wherein
the first and second substrates are fixed by a bolt.

6. The device according to claim 1, wherein
the transmission line extends in a longitudinal direction of the antenna board.

7. The device according to claim 6, wherein
the transmission line has a predetermined length shorter than a length of the substrate in the longitudinal direction.

8. The device according to claim 7, wherein
the transmission line is arranged at the center of the substrate in the longitudinal direction.

9. The device according to claim 7, wherein
the transmission line is located at one end of the substrate in the longitudinal direction.

10. The device according to claim 1, wherein
the transmission line has a center portion separated from the upper edge of the substrate by a predetermined length in a direction perpendicular to the conveyance path.

11. An antenna for a label issuance device having a roller to convey
a label including an RFID tag along a conveyance path and a reader/writer configured to read and write from and to the RFID tag through the antenna, the antenna comprising:
a substrate disposed under the conveyance path and having opposite planar surfaces that are perpendicular to a surface of the conveyed label, wherein
a transmission line is formed at an upper edge of the substrate that faces the conveyed label, and
a ground layer is formed on each of the opposite planar surfaces of the substrate.

12. The antenna according to claim 11, wherein
the substrate includes first and second substrates, and
the transmission line is formed on one planar surface of the first substrate.

13. The antenna according to claim 12, wherein
the ground layer is formed on the other planar surface of the first substrate and on one planar surface of the second substrate that does not face the one planar surface of the first substrate.

14. The antenna according to claim 13, wherein
another ground layer is formed on the one planar surface of the first substrate and on the other planar surface of the second substrate.

15. The antenna according to claim 12, wherein
the first and second substrates are fixed by a bolt.

16. The antenna according to claim 11, wherein
the transmission line extends in a longitudinal direction of the substrate.

17. The antenna according to claim 16, wherein
the transmission line has a predetermined length shorter than a length of the substrate in the longitudinal direction.

18. The antenna according to claim 17, wherein
the transmission line is arranged at the center of the substrate in the longitudinal direction.

19. The antenna according to claim 17, wherein
the transmission line is located at one end of the substrate in the longitudinal direction.

20. The antenna according to claim 11, wherein
the transmission line has a center portion separated from the upper edge of the substrate by a predetermined length in a direction perpendicular to the conveyance path.

* * * * *